United States Patent
Theill

(10) Patent No.: US 10,111,012 B2
(45) Date of Patent: Oct. 23, 2018

(54) HEARING AID SYSTEM AND A METHOD OF OPERATING A HEARING AID SYSTEM

(71) Applicant: Widex A/S, Lynge (DK)

(72) Inventor: Jesper Theill, Lynge (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 15/383,298

(22) Filed: Dec. 19, 2016

(65) Prior Publication Data

US 2017/0180876 A1 Jun. 22, 2017

(30) Foreign Application Priority Data

Dec. 22, 2015 (DK) ................................ 2015 00829

(51) Int. Cl.
*H04R 25/00* (2006.01)
*H04B 17/30* (2015.01)
*H04B 17/345* (2015.01)
*G10L 25/84* (2013.01)

(52) U.S. Cl.
CPC .......... *H04R 25/356* (2013.01); *H04B 17/30* (2015.01); *H04B 17/345* (2015.01); *H04R 25/505* (2013.01); *G10L 25/84* (2013.01); *H04R 2225/43* (2013.01); *H04R 2430/03* (2013.01)

(58) Field of Classification Search
CPC .............. H04R 25/356; H04R 2225/43; H04R 2430/03; H04B 17/30; H04B 17/345; G10L 25/84

USPC .................................................. 381/320, 321
See application file for complete search history.

(56) References Cited

U.S. PATENT DOCUMENTS

| | | |
|---|---|---|
| 5,455,845 A | 10/1995 | Sullivan |
| 5,838,801 A | 11/1998 | Ishige et al. |
| 8,045,739 B2 | 10/2011 | Palludan-Mueller et al. |
| 2013/0195302 A1* | 8/2013 | Meincke ................. G10L 21/02 381/321 |
| 2014/0270294 A1* | 9/2014 | Andersen ................ G10L 21/02 381/321 |

FOREIGN PATENT DOCUMENTS

| | | |
|---|---|---|
| EP | 1 522 206 B1 | 10/2007 |
| EP | 1 932 389 A1 | 6/2008 |
| EP | 1 380 187 B1 | 10/2008 |
| WO | 2015/078501 A1 | 6/2015 |
| WO | 2016/096043 A1 | 6/2016 |

OTHER PUBLICATIONS

Danish Search Report for Patent Application No. PA 2015 00829 dated Jul. 14, 2016.

* cited by examiner

*Primary Examiner* — Sunita Joshi
(74) *Attorney, Agent, or Firm* — Sughrue Mion, PLLC

(57) ABSTRACT

A method (200) of operating a hearing aid system based on an enhancement of frequency contrast by increasing the gain applied to a frequency band if a measure of the signal variability is above a threshold that depends on the signal variability in other frequency bands and a hearing aid system (100) for carrying out the method.

15 Claims, 2 Drawing Sheets

HEARING AID SYSTEM AND A METHOD OF OPERATING A HEARING AID SYSTEM

This application is based on and claims priority from Danish application PA201500829 filed Dec. 21, 2015, the contents of which are incorporated by reference herein.

The present invention relates to hearing aid systems. The present invention also relates to a method of operating a hearing aid system and a computer-readable storage medium having computer-executable instructions, which when executed carries out the method.

BACKGROUND OF THE INVENTION

Generally a hearing aid system according to the invention is understood as meaning any system which provides an output signal that can be perceived as an acoustic signal by a user or contributes to providing such an output signal, and which has means which are used to compensate for an individual hearing deficiency of the user or contribute to compensating for the hearing deficiency of the user. These systems may comprise hearing aids which can be worn on the body or on the head, in particular on or in the ear, and can be fully or partially implanted. However, some devices whose main aim is not to compensate for a hearing deficiency may also be regarded as hearing aid systems, for example consumer electronic devices (televisions, hi-fi systems, mobile phones, MP3 players etc.) provided they have, however, measures for compensating for an individual hearing deficiency.

Within the present context a hearing aid may be understood as a small, battery-powered, microelectronic device designed to be worn behind or in the human ear by a hearing-impaired user.

Prior to use, the hearing aid is adjusted by a hearing aid fitter according to a prescription. The prescription is based on a hearing test, resulting in a so-called audiogram, of the performance of the hearing-impaired user's unaided hearing. The prescription may be developed to reach a setting where the hearing aid will alleviate a hearing deficiency by amplifying sound at frequencies in those parts of the audible frequency range where the user suffers a hearing deficit.

A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear. For this type of traditional hearing aids the mechanical design has developed into a number of general categories. As the name suggests, Behind-The-Ear (BTE) hearing aids are worn behind the ear. To be more precise, an electronics unit comprising a housing containing the major electronics parts thereof is worn behind the ear, and an earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In some modern types of hearing aids a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids. This type of hearing aid requires an especially compact design in order to allow it to be arranged in the ear canal, while accommodating the components necessary for operation of the hearing aid.

Within the present context a hearing aid system may comprise a single hearing aid (a so called monaural hearing aid system) or comprise two hearing aids, one for each ear of the hearing aid user (a so called binaural hearing aid system). Furthermore the hearing aid system may comprise an external device, such as a smart phone having software applications adapted to interact with other devices of the hearing aid system, or the external device alone may function as a hearing aid system. Thus within the present context the term "hearing aid system device" may denote a traditional hearing aid or an external device.

It is well known for persons skilled in the art of hearing aid systems that some hearing aid system users are not satisfied with the performance of conventional hearing-aid systems that primarily are configured to relieve the detrimental effects of suffering from an elevated hearing threshold.

One method of operating a hearing aid system that has proven beneficial for hearing aid system users diagnosed with an elevated hearing aid threshold is disclosed in e.g. EP-B1-1932389. Herein is disclosed a so called compressor that applies a frequency dependent gain as a function of input signal level and the degree of hearing loss. The compressor ensures that an appropriate gain is applied such that the elevated hearing threshold is compensated.

Another method of operating a hearing aid system that has proven beneficial for hearing aid system users diagnosed with an elevated hearing aid threshold is disclosed in EP-B1-1522206. This method is capable of optimizing speech intelligibility of an acoustical signal by applying a frequency dependent gain. The frequency dependent gain is determined iteratively. The method takes factors such as signal-to-noise ratio, masking effects and frequency band importance into account.

Yet another method of operating a hearing aid system that has proven beneficial for hearing aid system users diagnosed with an elevated hearing aid threshold is given in EP-B1-1380187 that discloses a directional system that is capable of suppressing noise from undesired directions.

A subgroup of potential hearing aid users are assumed to have auditory-nerve dysfunction (that may also be denoted auditory neurodegeneration) due to aging or ototoxic drug exposure or noise trauma. This type of hearing deficit is typically not diagnosed as part of a traditional hearing aid fitting and consequently few, if any, methods of operating hearing aid systems in order to relieve this type of hearing deficit are available.

It is therefore a feature of the present invention to suggest a method of operating a hearing aid system in order to provide hearing-aid sound processing that can benefit individuals with an auditory-nerve dysfunction.

It is another feature of the present invention to suggest a hearing aid system adapted to carry out a sound processing method that can benefit individuals with an auditory-nerve dysfunction.

SUMMARY OF THE INVENTION

The invention, in a first aspect, provides a method of operating a hearing aid system comprising the steps of:

providing an electrical input signal representing an acoustical signal from an input transducer of the hearing aid system; splitting the input signal into a first plurality of frequency bands; determining a measure of the signal variability for each band of a second plurality of frequency bands; determining a threshold level based on the determined measures of the signal variability for each band of the second plurality of frequency bands; applying a first gain to a frequency band based on an evaluation of the determined measure of the signal variability for said frequency band relative to the threshold level; combining the first plurality of frequency bands into an electrical output signal; and using the electrical output signal for driving an output transducer of the hearing aid system; wherein the step of determining the threshold level comprises the steps of: determining a maximum value of the signal variability measures from said second plurality of frequency bands; determining a minimum value of the signal variability measures from said second plurality of frequency bands; and selecting the threshold level to be within the range defined by the determined minimum and maximum values of the signal variability measure.

The invention, in a second aspect, provides a non-transitory computer-readable storage medium having computer-executable instructions thereon, which when executed by a computer perform the following method: providing an electrical input signal representing an acoustical signal from an input transducer; splitting the input signal into a first plurality of frequency bands; determining a measure of the signal variability for each band of a second plurality of frequency bands; determining a threshold level based on the determined measures of the signal variability for each band of the second plurality of frequency bands; applying a first gain to a frequency band based on an evaluation of the determined measure of the signal variability for said frequency band relative to the threshold level; combining the first plurality of frequency bands into an electrical output signal; and using the electrical output signal for driving an output transducer, wherein the step of determining the threshold level comprises the steps of: determining a maximum value of the signal variability measures from said second plurality of frequency bands; determining a minimum value of the signal variability measures from said second plurality of frequency bands; and selecting the threshold level to be within the range defined by the determined minimum and maximum values of the signal variability measure.

The invention, in a third aspect, provides a hearing aid system comprising: an input transducer adapted to provide an input signal; a filter bank adapted to split the input signal into a plurality of frequency bands; a frequency contrast enhancer adapted to determine a set of first gains, to be applied to respective frequency bands of said plurality of frequency bands, based on an evaluation of a determined measure of the signal variability for a frequency band relative to a threshold level; wherein the threshold level is determined based on the determined measure of the signal variability for each of said plurality of frequency bands by (i) determining a maximum value of the signal variability measures from said second plurality of frequency bands; (ii) determining a minimum value of the signal variability measures from said second plurality of frequency bands; and (iii) selecting the threshold level to be within the range defined by the determined minimum and maximum values of the signal variability measure; an inverse filter bank adapted to combine the plurality of frequency bands, hereby providing an electrical output signal; and an output transducer adapted for providing an acoustical output signal based on the electrical output signal.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects, all without departing from the invention. Accordingly, the drawings and descriptions will be regarded as illustrative in nature and not as restrictive. In the drawings.

DETAILED DESCRIPTION

Figure 1:
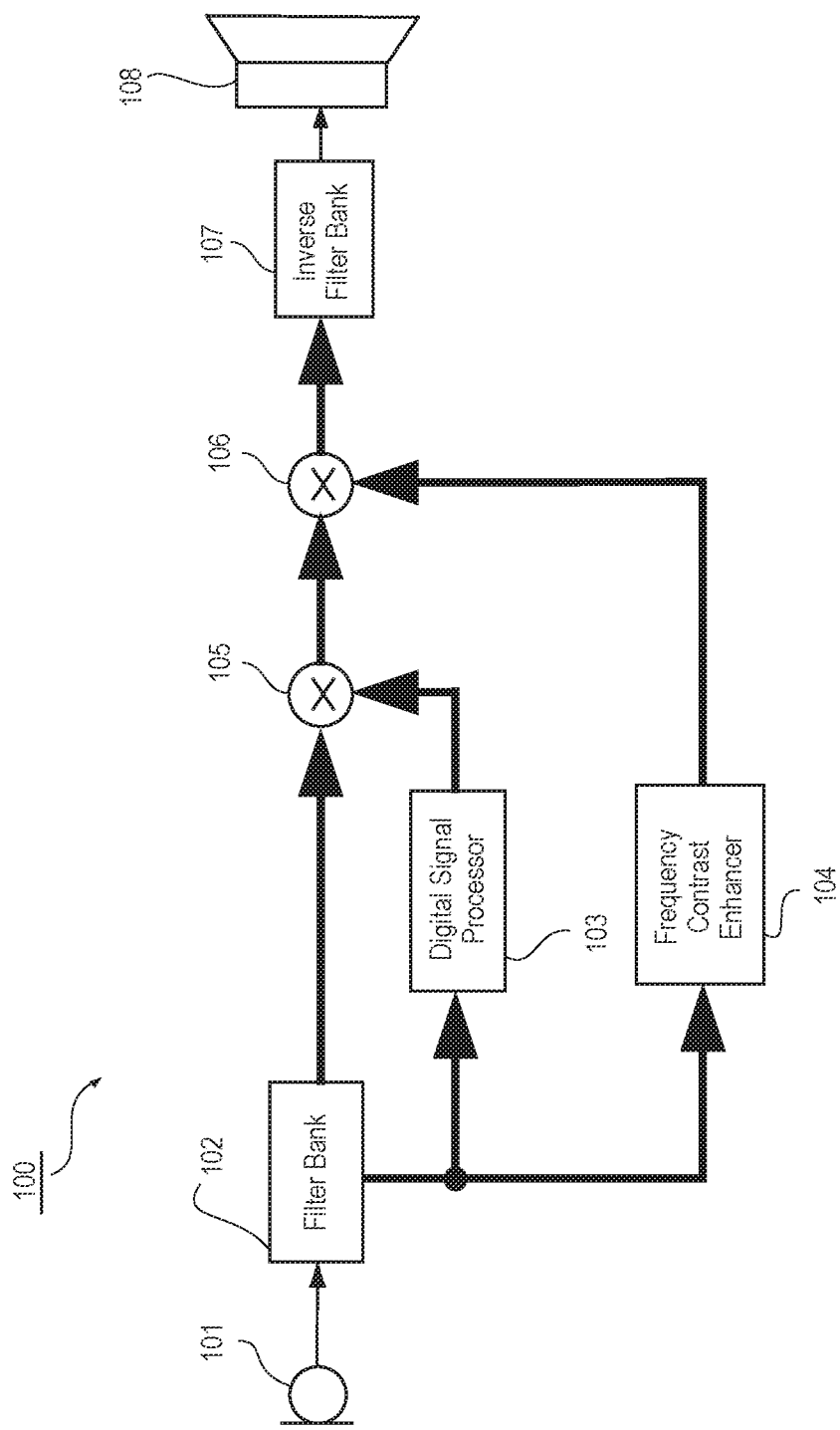
FIG. 1 illustrates highly schematically a hearing aid according to a first embodiment of the invention.

Reference is first made to FIG. 1 that illustrates highly schematically a hearing aid or a hearing aid system 100 according to a first embodiment of the invention. The hearing aid 100 comprises an acoustical-electrical input transducer 101, a filter bank 102, a digital signal processor 103, a frequency contrast enhancer 104, two gain multipliers 105 and 106, an inverse filter bank 107 and an electrical-acoustical output transducer 108.

The acoustical-electrical input transducer 101 provides a broadband input signal that is provided to the filter bank 102 wherein the input signal is split into a first plurality of frequency bands, which are branched and hereby provided both to the digital signal processor 103 and to the frequency contrast enhancer 104. The plurality of frequency bands are illustrated by bold lines. In the following the broadband input signal may also simply be denoted input signal and the frequency band signals may also simply be denoted frequency bands.

The digital signal processor 103 is adapted to compensate a hearing loss (typically an elevated hearing threshold) of an individual hearing aid user by determining for each frequency band an appropriate gain as a function of a frequency band signal level. This functionality is well known within the art of hearing aid systems, and the term compressor may also be used for a component providing this type of functionality. Furthermore it is well known for a person skilled in the art that the number of available frequency bands may vary between say 3 and 2048. The gains determined by the digital signal processor 103 are applied to the frequency bands by the gain multiplier 105.

The frequency contrast enhancer 104 is adapted to determine a second plurality of frequency dependent gains that are adapted to enhance the frequency contrast of the input signal.

According to the present embodiment this is achieved by carrying out the method steps of:

providing for the second plurality of frequency bands a 10% percentile frequency band signal level;

providing for the second plurality of frequency bands an estimate of the absolute frequency band signal level that is determined in accordance with the formula:

$$x_f(s) = x_f(s-1)(1-\alpha) + |Y_f(s)|\alpha$$

wherein the index f represents a specific one of the frequency bands, wherein s represents a discrete time step determined by a sample rate, wherein $y_f(s)$ represents samples of the absolute signal level, wherein α is a constant in the range between 0.01 and 0.0001 or between 0.005 and 0.0005, and wherein the sample rate is 32 kHz or in the range between 30 and 35 kHz.

Obviously, the selected values of the sample rate and the constant α depend on each other in order to provide the estimate of the absolute signal level with the desired characteristics. In variations a may depend on the specific frequency band, since the signal variations and hereby the requirements to the absolute signal level estimate depend on the frequency range. Normally the first and second plurality of frequency bands will be identical, but in variations the second plurality may be a sub-group of the first plurality.

However, in variations other estimates of the absolute frequency band signal level may be used, e.g. the 90% percentile or a percentile signal in the range between 80% and 98%. Similarly other estimates may be used to provide a signal level that, like the 10% percentile, represents a noise level.

determining for each of the second plurality of frequency bands a frequency band level difference $\Delta L_f$ as the difference, given in dB, between the 10% percentile frequency band signal level and the estimate of the absolute frequency band signal level. In the following a frequency band level difference may also be denoted a measure of signal variability for the considered frequency band.

determining a magnitude difference as the difference, given in dB, between the largest frequency band level difference $\Delta L_{max}$ and the smallest frequency band level difference $\Delta L_{min}$;

determining the frequency band gains $G_f$ to be applied in each of the second plurality of frequency bands in accordance with the formula:

$$G_f = (\Delta L_f - (\Delta L_{max} - \Delta L_{min}) * K1) * G1$$

wherein K1 is a constant with a value of 0.7, wherein G1 is a constant gain factor with a value of 2, and wherein the range of allowed values of the gains $G_f$ are limited to be within an interval from −10 dB and to +12 dB.

The frequency band level measures $\Delta L_f$, $\Delta L_{max}$ and $\Delta L_{min}$ are all determined on a sample-by-sample basis, and according to the present embodiment the sample rate is 32 kHz or another rate in the range between 30 and 35 kHz, as already disclosed above. However, in variations still other sample rates may be selected such as in the range between 8 kHz and 128 kHz.

It follows directly from the formula used to determine the frequency band gains $G_f$ that a positive gain is applied to a frequency band if the frequency band level difference is larger than a threshold level, determined as the constant K1 multiplied with the magnitude difference. According to the present embodiment a value of 0.7 is selected for the constant K1 since this ensures that the threshold level will be within the range defined by the minimum and maximum values of the frequency band level differences for all typically occurring frequency band level differences (at least in so far that typical values are between 0 dB and 80 dB).

In another variation the level of the threshold is determined by selecting a level that is lower than the maximum value of the frequency band level differences and higher than the minimum value of the frequency band level differences.

In yet other variations the value of the constant K1 may be selected from a range between 0 and 1.

According to a variation the value of K1 is smaller for at least one high frequency band compared to at least one low frequency band because the overall signal level generally is lower in the high frequency range.

In yet other variations the value of the constant gain factor G1 may be selected from a range between 0 and 99. By increasing the value of the gain factor G1 then the determined frequency band gains $G_f$ will tend to be equal to either the minimum frequency band gain $G_{MIN}$ (−10 dB according to the present embodiment) or the maximum frequency band gain $G_{MAX}$ (+12 dB according to the present embodiment). Thus a higher value of the constant gain factor G1 provides more on/off type processing, in that values of the frequency band level difference that are only slightly above or below the threshold level will result in a determined frequency band gain that is close to the minimum or maximum frequency band gain. However, this approach may be considered too extreme for some users, despite that this type of processing may provide the most pronounced frequency contrast enhancement for the given values of the minimum and maximum frequency band gains $G_{MIN}$ and $G_{MAX}$.

According to a further variation the gain factor G1 may therefore be made available for fine tuning by a hearing aid system user.

In a variation the gain factor G1 is lower in the low frequency range compared to the high frequency range because the signal variations in the low frequency range is generally slower compared to the high frequency range, and generally a better sound quality is therefore obtained if a relatively smooth (i.e. less on/off) type of processing is used in the low frequency range.

According to a variation the value of the maximum frequency band gain $G_{MAX}$ may be selected from a range between 0 dB and +25 dB. However, it may be sufficient with a smaller value of the maximum frequency band gain $G_{MAX}$ in the frequency bands with low frequency content because these frequency bands generally have a relative low impact on the perceived speech intelligibility, and consequently the value of the maximum frequency band gain $G_{MAX}$ may be selected from a more restricted range between e.g. +3 dB and +7 dB, whereby a too extreme processing and hereby unnecessary loss of sound quality may be avoided.

In a similar variation the value of the minimum frequency band gain $G_{MIN}$ may be selected from a range between −20 dB and 0 dB, and more specifically it may be sufficient with a numerically smaller value of the minimum frequency band gain $G_{MIN}$ in the frequency bands with low frequency content because these frequency bands generally have a relatively low impact on the perceived speech intelligibility, and consequently the value of the minimum frequency band gain $G_{MIN}$ may be selected from a range between 0 dB and −7 dB whereby a too extreme processing and hereby unnecessary loss of sound quality may be avoided. However, also the frequency bands with high frequency content may benefit from selecting the value of the minimum frequency band gain $G_{MIN}$ from a more restricted range between say 0 dB and −7 dB in order to avoid unnecessary attenuation of high frequency sound.

in the final method steps the gains determined by the frequency contrast enhancer 104 are applied to the frequency bands by the gain multiplier 106 and hereby providing processed frequency bands that are combined in the inverse filter bank 107, wherefrom an output signal is provided to the electrical-acoustical output transducer 108.

According to a further variation the frequency contrast enhancer 104 is only activated in response to a detection of speech. It is noted that speech detectors are generally well known within the art of hearing aid systems.

According to another variation the digital signal processor 103 may be adapted such that the digital signal processor 103 in addition to compensating a traditional hearing loss (typically an elevated hearing threshold) also enhances speech intelligibility for an individual hearing aid user by determining for each frequency band an appropriate gain as a function of a frequency band signal level, and in a further variation the digital signal processor 103 is also adapted to suppress noise in the input signal. In further variations basically any additional sound processing features, such as feedback cancelling, may be implemented as part of the digital signal processor 103. These additional features may be implemented in a multitude of different manners as will be known for a person skilled in the art.

According to another variation the digital signal processor 103 is not adapted to compensate a hearing loss of an individual suffering from an elevated hearing threshold, since hearing deficiencies such as auditory-nerve dysfunction are not necessarily accompanied by an elevated hearing threshold.

Generally it is noted, that although the various elements of the hearing aid system may be depicted as separate processing blocks, then the separate processing blocks may very well be implemented in a single digital signal processor.

According to an alternative and more simple implementation of the frequency contrast enhancer 104, the individual frequency band gains $G_f$ are determined independently of the signal levels in the other frequency bands. Thus if a frequency band level difference $\Delta L_f$ exceeds a pre-determined threshold level for the given frequency band then a positive gain is applied, and similarly a negative gain may be applied if the frequency band level difference $\Delta L_f$ falls below the pre-determined threshold level for the given frequency band. In a further variation this alternative implementation of the frequency contrast enhancer 104 may be used together and in parallel with the frequency contrast enhancer already disclosed with reference to FIG. 1.

According to yet another alternative implementation of the frequency contrast enhancer 104, a first predetermined number of frequency bands having the highest measures of signal variability are enhanced relative to the remaining frequency bands. The first predetermined number may be one or two or selected from a range between 1 and 10. The first predetermined number of frequency bands may be enhanced by having a fixed positive gain applied or by having a gain applied that depends on the measure of the signal variability for each of the frequency band being among the first predetermined number of frequency bands. In further variations the frequency bands that are not among the first predetermined number of frequency bands may be attenuated by applying either a fixed or variable gain.

Figure 2:
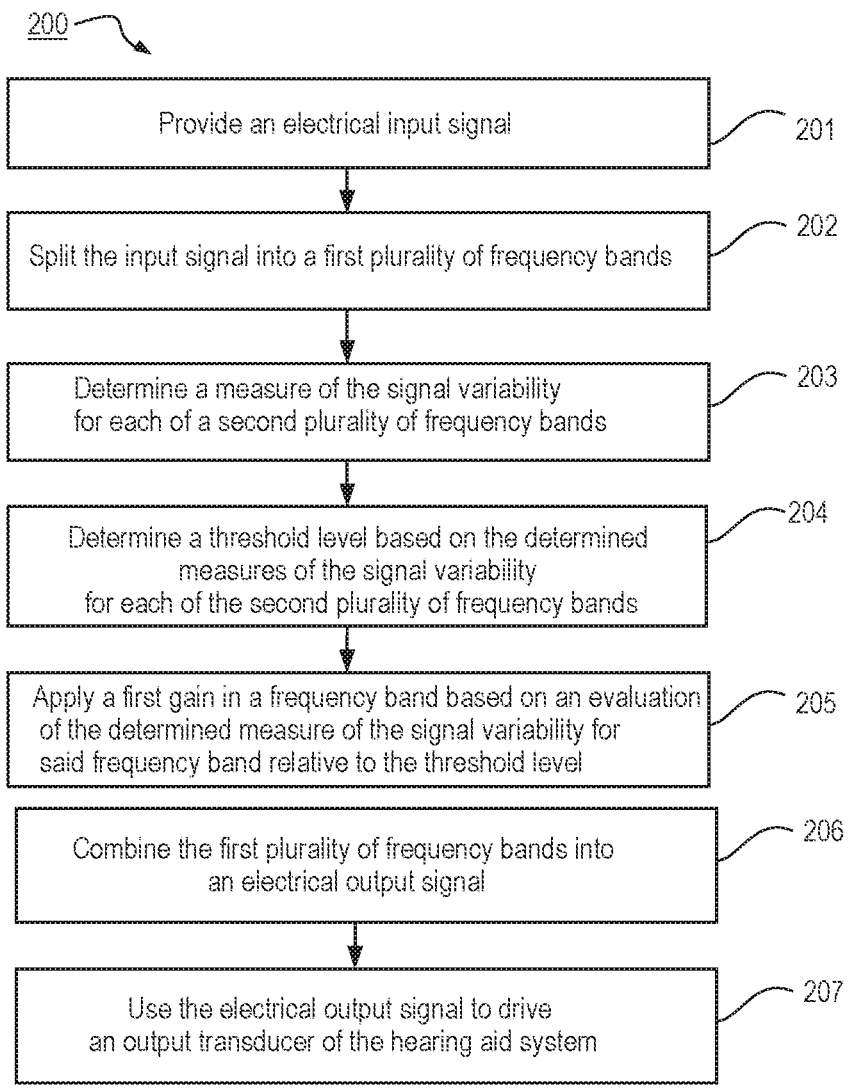
FIG. 2 illustrates a flow chart of a method according to an embodiment of the invention.

Reference is now made to FIG. 2 which illustrates highly schematically a method 200 of operating a hearing aid system according to an embodiment of the invention. The method comprises:

providing, in step 201, an electrical input signal representing an acoustical signal from an input transducer of the hearing aid system;

splitting, in step 202, the input signal into a first plurality of frequency bands;

determining, in step 203, a measure of the signal variability for each of a second plurality of frequency bands, wherein the first plurality of frequency bands comprises the second plurality of frequency bands;

determining, in step 204, a threshold level based on the determined measure of the signal variability for each of the second plurality of frequency bands;

applying, in step 205, a first gain to each of said second plurality of frequency bands based on an evaluation of the determined measure of the signal variability, for each of said second plurality of frequency bands, relative to the threshold level;

combining, in step 206, the first plurality of frequency bands into an electrical output signal; and using, in step 207, the electrical output signal for driving an output transducer of the hearing aid system.

It is suspected that persons suffering from an auditory neurodegeneration will be more susceptible to temporal masking due to the reduced number of low spontaneous rate fibers. It is therefore a specific advantage of the present invention that this problem may be relieved by narrowing the frequency bandwidth of e.g. syllables or other desired sound parts. Hereby the less strong frequency part of the desired sound parts will be attenuated relative to the strongest frequency parts whereby the contribution to temporal masking from the less strong frequency parts will be reduced.

Furthermore, the method of the present invention is particularly advantageous because it may be applied together with at least one of existing methods directed at respectively compensating an elevated hearing threshold, enhancing speech intelligibility and suppressing noise. Hereby a hearing aid system user suffering from an auditory neurodegeneration may be given an improved relief.

It is another advantage of the present invention that the method is relatively simple to implement and therefore processing efficient.

In a further variation of the disclosed embodiments the application of a negative gain may be replaced by insertion of a stop band filter or by simply powering down the relevant frequency band.

Generally any of the disclosed embodiments of the invention may be varied by including one or more of the variations disclosed above with reference to another of the disclosed embodiments of the invention. Thus the disclosed method embodiment may also be varied by including one or more of the hearing aid system variations.

The invention claimed is:

1. A method of operating a hearing aid system comprising the steps of:

providing an electrical input signal representing an acoustical signal from an input transducer of the hearing aid system;

splitting the input signal into a first plurality of frequency bands;

determining a measure of the signal variability for each band of a second plurality of frequency bands;

determining a threshold level based on the determined measures of the signal variability for each band of the second plurality of frequency bands;

applying a first gain to a frequency band based on an evaluation of the determined measure of the signal variability for said frequency band relative to the threshold level;

combining the first plurality of frequency bands into an electrical output signal; and using the electrical output signal for driving an output transducer of the hearing aid system;

wherein the step of determining the threshold level comprises the steps of:
  determining a maximum value of the signal variability measures from said second plurality of frequency bands;
  determining a minimum value of the signal variability measures from said second plurality of frequency bands; and
  selecting the threshold level to be within the range defined by the determined minimum and maximum values of the signal variability measure.

2. The method according to claim 1, wherein the step of determining the threshold level comprises the further step of:
  determining the threshold level by multiplying a constant with the difference between the determined maximum and minimum values of the signal variability measure.

3. The method according to claim 1, wherein the step of applying a first gain in a frequency band based on an evaluation of the determined measure of the signal variability for said frequency band relative to the threshold level comprises the further steps of:
  applying a positive first gain in a frequency band if the determined measure of the signal variability for said frequency band is larger than the threshold level and/or applying a negative first gain in the frequency band if the determined measure of the signal variability for said frequency band is smaller than the threshold level.

4. The method according to claim 3, wherein the positive first gain is limited to be in the range between 0 dB and +25 dB.

5. The method according to claim 3, wherein the negative first gain is limited to be in the range between 0 dB and −25 dB.

6. The method according to claim 1, wherein the step of determining a measure of the signal variability for each of the second plurality of frequency bands comprises the steps of:
  providing a first estimate of a frequency band signal level based on a first type of level estimation that represents an estimation of the absolute frequency band signal level;
  providing a second estimate of the frequency band signal level based on a second type of level estimation that represents an estimate of the frequency band noise level; and
  determining the measure of the signal variability as the difference between the first estimate of the frequency band signal level and the second estimate of the frequency band signal level.

7. The method according to claim 1 comprising the further step of:
  applying a second gain to a frequency band in order to compensate an elevated threshold hearing loss of an individual hearing aid user and/or in order to enhance speech intelligibility of the acoustical signal provided from the input transducer of the hearing aid system and/or in order to suppress noise.

8. The method according to claim 1, wherein the second plurality of frequency bands consists of all the first plurality of frequency bands.

9. The method according to claim 1, wherein the second plurality of frequency bands is a proper subset of the first plurality of frequency bands.

10. The method according to claim 1, wherein the second plurality of frequency bands consists of a number of frequency bands selected from a range between 10 and 32 or from a range between 20 and 28.

11. A non-transitory computer-readable medium storing instructions thereon, which when executed by a computer perform the following method:
  providing an electrical input signal representing an acoustical signal from an input transducer;
  splitting the input signal into a first plurality of frequency bands;
  determining a measure of the signal variability for each band of a second plurality of frequency bands;
  determining a threshold level based on the determined measures of the signal variability for each band of the second plurality of frequency bands;
  applying a first gain to a frequency band based on an evaluation of the determined measure of the signal variability for said frequency band relative to the threshold level;
  combining the first plurality of frequency bands into an electrical output signal; and
  using the electrical output signal for driving an output transducer;
  wherein the step of determining the threshold level comprises the steps of:
  determining a maximum value of the signal variability measures from said second plurality of frequency bands;
  determining a minimum value of the signal variability measures from said second plurality of frequency bands; and
  selecting the threshold level to be within the range defined by the determined minimum and maximum values of the signal variability measure.

12. A hearing aid system, comprising:
  an input transducer adapted to provide an input signal;
  a filter bank adapted to split the input signal into a plurality of frequency bands;
  a frequency contrast enhancer adapted to determine a set of first gains, to be applied to respective frequency bands of said plurality of frequency bands, based on an evaluation of a determined measure of the signal variability for a frequency band relative to a threshold level; wherein the threshold level is determined based on the determined measure of the signal variability for each of said plurality of frequency bands by (i) determining a maximum value of the signal variability measures from said second plurality of frequency bands; (ii) determining a minimum value of the signal variability measures from said second plurality of frequency bands; and (iii) selecting the threshold level to be within the range defined by the determined minimum and maximum values of the signal variability measure;
  an inverse filter bank adapted to combine the plurality of frequency bands, hereby providing an electrical output signal; and
  an output transducer adapted for providing an acoustical output signal based on the electrical output signal.

13. The hearing aid system according to claim 12, wherein the frequency contrast enhancer is further adapted to apply a positive first gain to a frequency band if the measure of the signal variability for said frequency band is larger than the threshold level and/or adapted to apply a negative first gain to the frequency band if the measure of the signal variability for said frequency band is smaller than the threshold level.

14. The hearing aid system according to claim 12, further comprising:

a digital signal processor adapted to determine a second gain, to be applied to a frequency band, in order to compensate an elevated threshold hearing loss of an individual hearing aid user and/or in order to enhance speech intelligibility of the acoustical signal provided from the input transducer of the hearing aid system and/or in order to suppress noise.

15. The hearing aid system according to claim 12, further comprising a speech detector and wherein the frequency contrast enhancer is adapted to only apply the first gain in response to a speech detector estimating that speech is present in the sound environment.

* * * * *